(12) United States Patent
Harrison et al.

(10) Patent No.: US 8,170,214 B2
(45) Date of Patent: May 1, 2012

(54) QKD TRANSMITTER AND TRANSMISSION METHOD

(75) Inventors: Keith Harrison, Stoke Gifford Bristol (GB); William Munro, Stoke Gifford Bristol (GB); Timothy Spiller, Stoke Gifford Bristol (GB); Michael Tan, Palo Alto, CA (US); Joanna Duligall, Stoke Gifford Bristol (GB); Radu Ionicioiu, Stoke Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 810 days.

(21) Appl. No.: 12/286,854

(22) Filed: Oct. 1, 2008

(65) Prior Publication Data
US 2010/0080394 A1    Apr. 1, 2010

(51) Int. Cl.
*H04L 29/06* (2006.01)
(52) U.S. Cl. .......................... 380/278; 713/150; 713/171
(58) Field of Classification Search .................. 380/278
See application file for complete search history.

(56) References Cited

U.S. PATENT DOCUMENTS

| | | | |
|---|---|---|---|
| 5,060,304 A | 10/1991 | Solinsky | |
| 5,515,438 A | 5/1996 | Bennett et al. | |
| 5,999,285 A | 12/1999 | Brandt et al. | |
| 6,154,299 A | 11/2000 | Gilbreath et al. | |
| 6,188,768 B1 * | 2/2001 | Bethune et al. | 380/278 |
| 2004/0190725 A1 * | 9/2004 | Yuan et al. | 380/283 |
| 2005/0036624 A1 * | 2/2005 | Kent et al. | 380/277 |
| 2006/0120529 A1 * | 6/2006 | Gisin et al. | 380/256 |
| 2006/0290941 A1 | 12/2006 | Kesler et al. | |
| 2007/0025551 A1 | 2/2007 | Harrison et al. | |
| 2007/0182968 A1 * | 8/2007 | Nishioka et al. | 356/491 |
| 2007/0248229 A1 | 10/2007 | Kawamoto | |

FOREIGN PATENT DOCUMENTS

| | | |
|---|---|---|
| GB | 2 427 317 | 12/2006 |
| JP | 2008205667 | 9/2008 |
| WO | WO 01/86855 A2 | 11/2001 |

OTHER PUBLICATIONS

Bennett, Charles, H., et al., "Quantum Cryptography: Public Key Distribution and Coin Tossing", Int'l Conf. on Computers, Systems, & Signal Processing, pp. 175-179, Dec. 10-12, 1984.
Kullander, Fredrik et al., "FOI Laser communication with modulated retro reflectors—progress report", Dec. 2006.

* cited by examiner

*Primary Examiner* — Edward Zee
*Assistant Examiner* — Yogesh Paliwal

(57) ABSTRACT

In order to facilitate alignment of a QKD transmitter and QKD receiver, the transmitter is provided with a retro-reflector for returning to the receiver a photon beam originating at the latter. The transmitter is arranged to polarization modulate the retro-reflected beam. The transmitter is provided both with an intensity detector for generating an indication of retro-reflected photon intensity, and an intensity-dependent controller for controlling the QKD transmitter in dependence on the detected photon intensity. In one embodiment, this control involves aborting operation of the QKD transmitter upon an unexpectedly high photon intensity being detected; in another embodiment, the intensity indication is used to control the attenuation of the retro-reflected beam so as stabilize the average retro-reflected photon count per unit time.

11 Claims, 4 Drawing Sheets

QKD TRANSMITTER AND TRANSMISSION METHOD

FIELD OF THE INVENTION

The present invention relates to a QKD (Quantum Key Distribution) transmitter and transmission method suitable for use in a hand-held device.

BACKGROUND OF THE INVENTION

QKD methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. Nos. 5,515,438, 5,999,285 and GB 2427317 A.

Whatever particular QKD system is used, QKD methods typically involve QKD transmitting apparatus 10 (see FIG. 1 of the accompanying drawings) using a QKD transmitter 12 to send a random data set provided by random source 11, over a quantum signal channel 5 to a QKD receiver 22 of QKD receiving apparatus 20. The QKD transmitting and receiving apparatus 10, 20 then respectively process the data transmitted and received via the quantum signal channel in respective processing sub-systems 13, 23 thereby to derive a common subset m of the random data set. This processing is done with the aid of messages exchanged between the processing sub-systems 13, 23 via an insecure classical communication channel 6 established between classical channel transceivers 14 and 24 of the transmitting and receiving apparatus 10, 20 respectively. As the quantum signal channel 5 is a noisy channel, the processing of the data received over that channel includes an error correction phase that relies on messages exchanged over the classical channel 6.

In most known QKD systems, the quantum signal is embodied as a stream of randomly polarized photons sent from the transmitting apparatus to the receiving apparatus either through a fiber-optic cable or free space; such systems typically operate according to the well-known BB84 quantum coding scheme (see C. H. Bennett and G. Brassard "Quantum Cryptography: Public Key Distribution and Coin Tossing", Proceedings of IEEE International Conference on Computers Systems and Signal Processing, Bangalore India, December 1984, pp 175-179).

In such systems, the QKD transmitter 12 provides the optical components for selectively polarizing photons, and the QKD receiver 22 provides the optical components for receiving photons and detecting their polarization. Typically, these optical components establish two pairs of orthogonal polarization axes, the two pairs of polarization axes being offset by 45° relative to each other. Conventionally, these two pairs of polarization axes are referred to as vertical/horizontal and diagonal/anti-diagonal respectively. An example QKD transmitter 12 and QKD receiver 22 will now be described with reference to FIGS. 2 and 3 respectively of the accompanying drawings.

The QKD transmitter 12 of FIG. 2 comprises an array of light emitting diodes (LEDs) 15A-D in front of each of which is a respective polarizing filter 16A-16D. Filter 16A polarizes photons emitted from LED 15A vertically, filter 16B polarizes photons emitted from LED 15B horizontally, filter 16C polarizes photons emitted from LED 16C diagonally and filter 16D polarizes photons emitted from LED 16D anti-diagonally. Thus, each photon in the stream of photons coming away from the filters 16A-D, is polarized in one of four directions, these directions corresponding to two pairs of orthogonal polarization axes at 45° to each other. A fibre optic light guide 17 conveys the polarized photons out through a lens via a narrow band pass frequency filter 18 (for restricting the emitted photons to a narrow frequency range, typically plus or minus 1 nm), and a spatial filter 19 (for limiting light leakage outside the channel). An attenuation arrangement, not specifically illustrated, is also provided is to reduce the number of photons emitted; the attenuation arrangement may simply be an attenuating filter placed near the other filters or may take the form of individual power control circuits for regulating the power fed to each LED 15A to 15D when pulsed. Without the attenuation arrangement the number of photons emitted each time a LED is pulsed at normal levels would, for example, be of the order of one million; with the attenuation arrangement in place, the average emission rate is 1 photon per 10 pulses. Importantly this means that more than one photon is rarely emitted per pulse.

The FIG. 3 QKD receiver 22 comprises a lens 25, a quad-detector arrangement 30, and a fibre optic light guide 26 for conveying photons received through the lens 25 to the quad-detector arrangement 30. The quad-detector arrangement 30 comprises a beam splitter 31, a half-wave plate 36 for rotating the polarization of photons by 45°, a first paired-detector unit 32, and a second paired-detector unit 33. The first paired-detector unit 32 comprises a polarization-dependent beam splitter 34 and detectors 37A, 37B; the presence of the beam splitter 34 causes the polarizations detected by the detectors 37A and 37B to be mutually orthogonal. The second paired-detector unit 33 comprises a polarization-dependent beam splitter 35 and detectors 37C, 37D; the presence of the beam splitter 35 causes the polarizations detected by the detectors 37C and 37D to be mutually orthogonal. The polarization rotation effected by half-wave plate 36 causes the polarizations detected by the detectors 37A, 37B to be at 45° to those detected by the detectors 37C, 37D; more specifically, the paired detector unit 33 is arranged to detect horizontal/vertical polarizations whereas the paired detector unit 33 is arranged to detect diagonal/anti-diagonal polarizations.

The beam splitter 31 is depicted in FIG. 3 as half-silvered mirror but can be of other forms such as diffraction gratings. The polarization-dependent beam splitters 34, 35 are, for example, birefringent beam splitters.

Operation of the apparatus of FIGS. 1 to 3 in accordance with the BB84 protocol is generally as follows with the QKD transmitting apparatus 10 and QKD receiving apparatus being conventionally referred to as 'Alice' and 'Bob' respectively. It is assumed that Alice and Bob have a predetermined agreement as to the length of a time slot in which a unit of data will be emitted.

Alice randomly generates (using source 11) a multiplicity of pairs of bits, typically of the order of $10^8$ pairs. Each pair of bits consists of a data bit and a basis bit, the latter indicating the pair of polarization axes to be used for sending the data bit, be it vertical/horizontal or diagonal/anti-diagonal. A horizontally or diagonally polarized photon indicates a binary 1, while a vertically or anti-diagonally polarized photon indicates a binary 0. The data bit of each pair is thus sent by Alice over the quantum signal channel 5 encoded according to the pair of polarization directions indicated by the basis bit of the same pair. When receiving the quantum signal from Alice, Bob randomly chooses, by virtue of the action of the half-silvered mirror 31, which paired-detector unit 32, 33 and thus which basis (pair of polarization directions) it will use to detect the quantum signal during each time slot and records the results. The sending of the data bits of the randomly-generated pairs of bits is the only communication that need occur using the quantum channel 5.

Next, Bob sends Alice, via the classical channel 6, partial reception data comprising the time slots in which a signal was received, and the basis (i.e. pair of polarization directions) thereof, but not the data bit values determined as received.

Alice then determines a subset m of its transmitted data as the data bit values transmitted for the time slots for which Bob received the quantum signal and used the correct basis for determining the received bit value. Alice also sends Bob, via the classical channel 6, information identifying the time slots holding the data bit values of m. Bob then determines the data bit values making up the received data. The next phase of operation is error correction of the received data by an error correction process involving messages passed over the classical channel 6; after error correction, Bob's received data should match the data m held by Alice and this can be confirmed by exchanging checksums over the classical channel 6.

A requirement for the successful transmission of the quantum signal over the quantum signal channel 5 is that the quantum signal is correctly aligned with the quantum signal detector arrangement of the receiving apparatus 20, both directionally and such that the polarization directions of the transmitting and receiving apparatus 10, 20 have the same orientation. Where both the transmitting and receiving apparatus 10, 20 are fixed in position, this is not a major issue as alignment need only be effected once, that is, at the time the apparatus is installed. However, where one or both apparatus 10, 20 are movable, alignment is a greater issue as it will need to be done repeatedly.

For example, the QKD transmitting apparatus may take the form of a hand-held device intended to cooperate with fixed receiving apparatus; one possible scenario where this could be the case is depicted in FIG. 4. More particularly, in FIG. 4 a user 100 is shown holding a hand-held QKD transmitting device 10 to interface with a QKD receiving apparatus 20 incorporated into a bank ATM (Automatic Teller Machine) 101. The QKD transmitting device 10 and QKD receiving device 20, enable the user and the ATM to establish a shared secret key which can be used to encrypt transaction messages passed between them, for example, over the classical communication channel used by the QKD system.

In cases, such as that depicted in FIG. 4, in which a hand-holdable transmitting apparatus is intended to cooperate with fixed receiving apparatus, quantum signal alignment can be achieved using an active alignment system that employs uses an alignment channel between the transmitting and receiving apparatus to generate alignment adjustment signals for use in aligning the transmitting apparatus 2 and the receiving apparatus 4; example active alignment systems for a hand-held QKD transmitting apparatus are disclosed in US published application 20070025551 (Assignees: Hewlett-Packard Development Company, and The University of Bristol, UK).

It would be better if the need for an active alignment system could be avoided at least for alignment of the longitudinal axes of the transmitting and receiving systems.

It is known to use a retro-reflector located at a remote object to return a transmitted beam to its source. A retro-reflector is a device or surface that reflects a wave front back along a vector that is parallel to but opposite in direction from the angle of incidence. A number of different forms of retro-reflector are known (for example, a corner cube with a set of three mutually perpendicular mirrors that form a corner). One well known use of retro-reflectors is in the ongoing Lunar Laser Ranging Experiment that measures the distance between the Earth and the Moon using laser ranging. Lasers on Earth are aimed at retro-reflectors installed on the moon by the crews of Apollo missions 11, 14 and 15 and the time delay for the reflected light to return is determined.

U.S. Pat. No. 6,154,299 describes a system for remote optical communications that includes a base station and a remote station. The remote station includes a retro-reflector, a multiple quantum well modulator (MQW), and drive circuitry that drives the MQW. A base station transmitter sends an interrogating light beam to the MQW, which modulates the light beam based on the information in the electrical signal from the drive circuitry. The retro-reflector reflects the modulated light beam to the base station for detection by a receiver.

SUMMARY OF THE INVENTION

According to one aspect of the present invention, there is provided a QKD transmitter comprising:
 a retro-reflector for retro-reflecting an incoming photon beam;
 an optical arrangement disposed in front of the retro-reflector and functionally providing in order from the retro-reflector:
  a polarizer for imparting a predetermined polarization to the photon beam,
  a polarization modulator responsive to a control signal to rotate the polarization of the retro-reflected photon beam relative to said predetermined polarization whereby to polarization modulate the retro-reflected beam, and
  a high speed shutter for limiting photon transmission to a succession of discrete time slots,
  the optical arrangement also functionally providing an attenuator;
 an intensity detector for outputting an indication of retro-reflected photon intensity; and
 an intensity-dependent controller for controlling the QKD transmitter in dependence on said intensity indication.

Use of a retro-reflector and a modulator for modulating the retro-reflected beam effectively ensures automatic directional alignment of the transmitted QKD signal (the polarization-modulated retro-reflected photon beam) with a QKD receiver assuming the source of the photon beam is at the QKD receiver.

However, use of a the retro-reflector exposes the QKD transmitter to an active monitoring threat by a probe beam aimed at the transmitter as the reflected probe beam will betray the polarizations carried by the QKD signal; the provision of the intensity detector permits the use of any such probe beam to be countered.

Preferably the QKD transmitter is part of a QKD transmitting device intended for hand-held operation.

It will be appreciated that as used herein reference to a QKD transmitter or QKD transmitting apparatus is to be understood to mean a transmitter or apparatus that effects the QKD random modulation of a quantum signal rather than the apparatus that provides the source of the photons forming the quantum signal.

According to another aspect of the present invention, there is a QKD transmission method comprising:
 retro-reflecting an incoming photon beam;
 imparting a predetermined polarization to the photon beam;
 polarization modulating the retro-reflected photon beam by rotating the polarization of the retro-reflected photon beam relative to said predetermined polarization; and
 limiting reflection back out of the photon beam to a succession of discrete time slots, the method further comprising attenuating the photon beam in dependence on retro-reflected photon intensity such as stabilize the average retro-reflected photon count per time slot.

BRIEF DESCRIPTION OF THE DRAWINGS

An embodiment of the invention will now be described, by way of non-limiting example, with reference to the accompanying diagrammatic drawings of the prior art and of an embodiment of the invention, in which.

BEST MODE OF CARRYING OUT THE INVENTION

Figure 1:
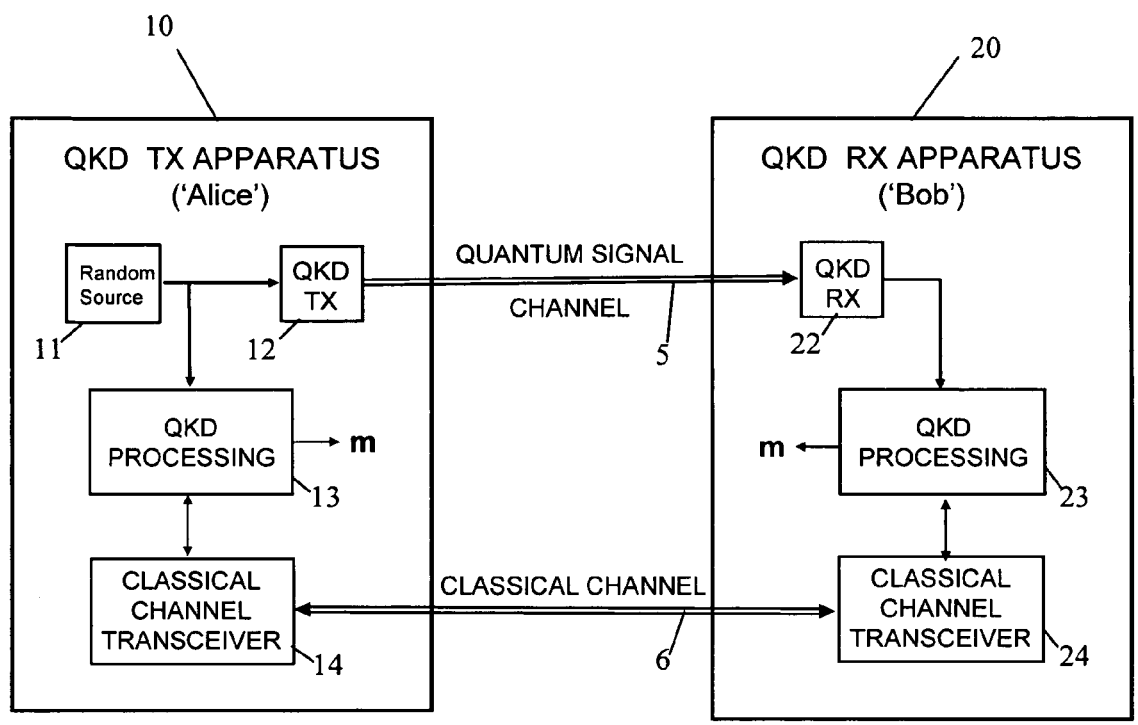
FIG. 1 is a diagram of a known QKD system.
Figure 5:
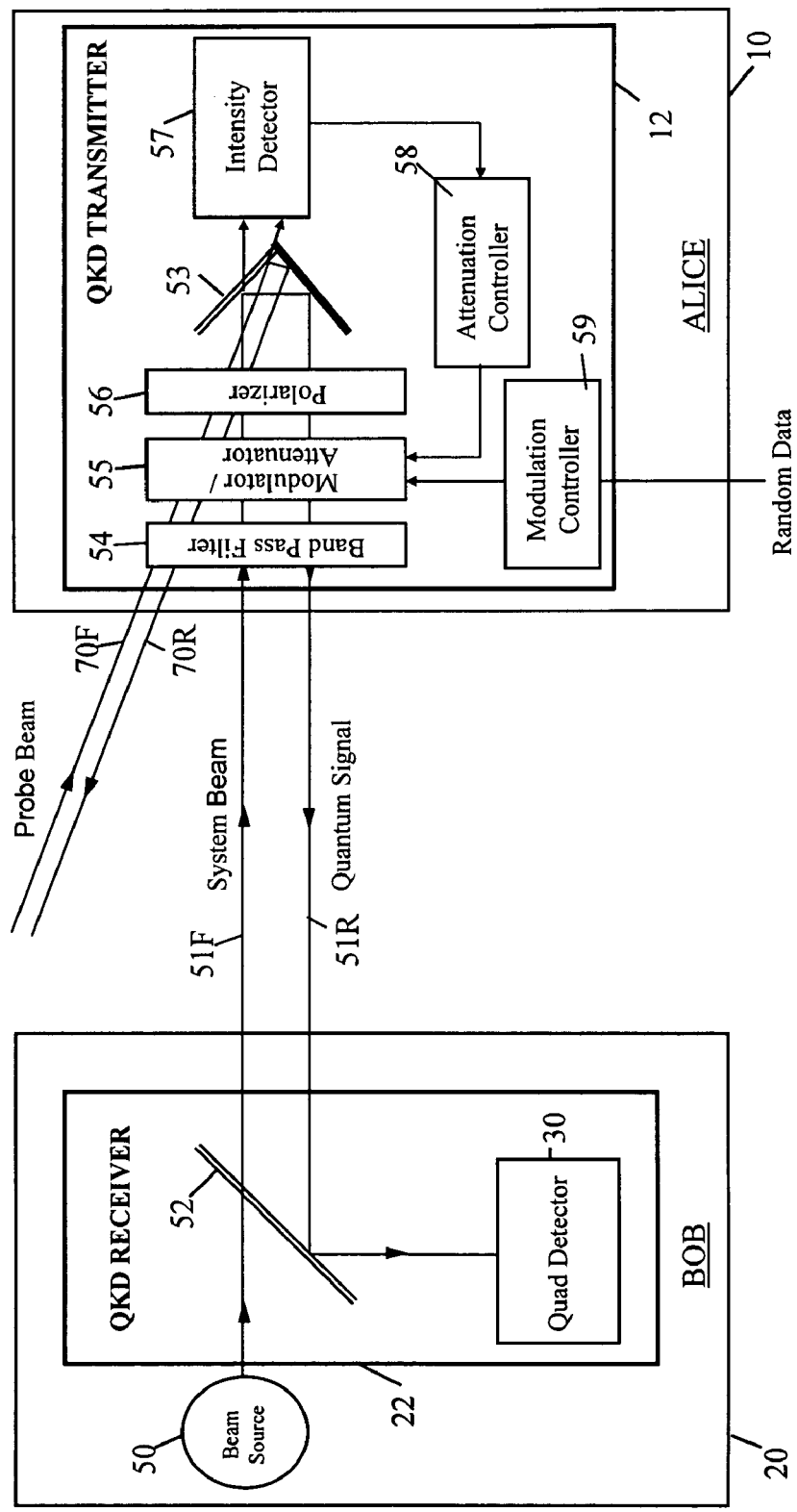
FIG. 5 is a diagram of a QKD system including a QKD transmitter embodying the present invention.

An example QKD transmitter embodying the embodiment will now be described with reference to FIGS. 5 and 6. FIG. 5 depicts both a QKD transmitter 12 of a hand-held QKD transmitting device 10 ("Alice"), and a QKD receiver 22 of QKD receiving apparatus 20 ("Bob"). The other elements of Alice and Bob (corresponding to elements 11, 13, 14, 23 & 24 of FIG. 1) are not illustrated as they are not directly relevant to the present invention.

In general terms, the QKD receiving apparatus 20 ("Bob") generates a beam of photons ("system beam" 51F) which it emits in the direction of the QKD transmitting apparatus 10 ("Alice"). The system beam 51F is retro-reflected, polarization modulated and attenuated by Alice to return a small number of the original photons back to Bob ("quantum signal" 51R) with random polarizations as set by Alice. The polarizations of the quantum-signal photons are then randomly detected by Bob.

Figure 3:
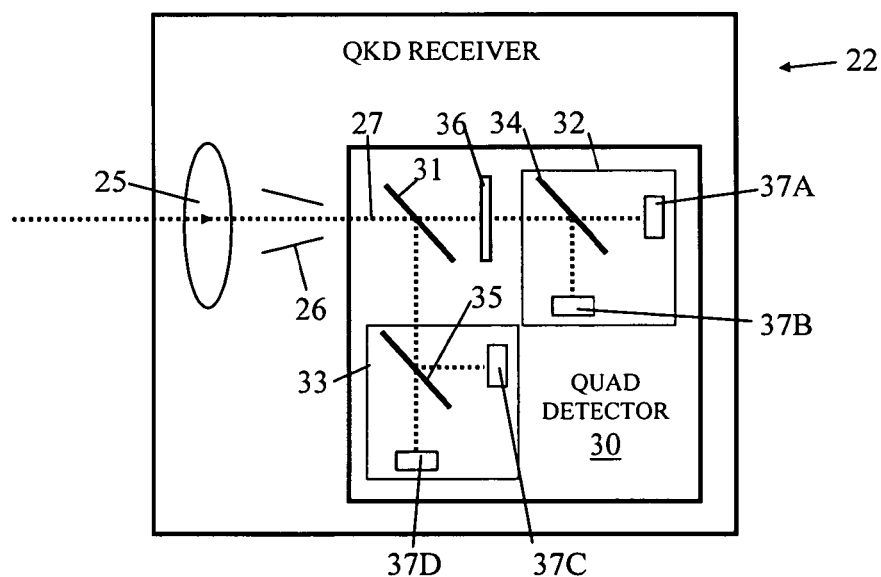
FIG. 3 is a diagram of a QKD receiver of the FIG. 1 system.
Figure 4:
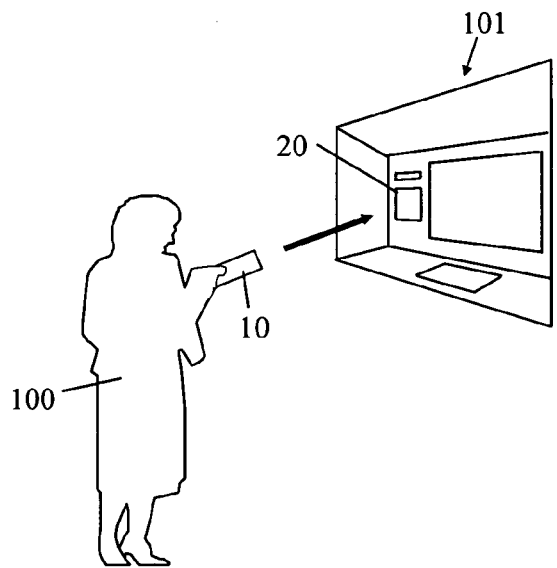
FIG. 4 is a diagram illustrating the use of a hand-held QKD transmitting device with a fixed QKD receiving apparatus.

In more detail, the QKD receiving apparatus 20 includes an intense photon beam source 50 generating the system beam 51F, and a QKD receiver 22 comprising a partially-silvered mirror 52 and a quantum-signal detector embodied, for example, as a quad detector 30 of the form described above with respect to FIG. 3. The beam 51F produced by the source 50 passes out through the mirror 52 towards the QKD transmitting apparatus 10 and the returning quantum signal 51R is reflected by the mirror 52 into the quantum signal detector 30. The form and operation of the QKD receiving apparatus is otherwise standard and will not be further described herein.

The QKD transmitter 12 of Alice comprises a retro-reflector 53 (of any form) in front of which is positioned an arrangement of optical components comprising:

- a narrow band-pass filter 54 only allowing through photons in a narrow band of frequencies encompassing that of the beam 51F;
- a polarizer 56 for imparting to the photon stream passing through it a predetermined polarization (for example +22.5 degrees relative to a horizontal polarization axis of the transmitter 12); and
- a modulator/attenuator 55 for polarization modulating and attenuating the photon stream passing through it and for dividing up the photon stream into discrete pulses.

The optical component arrangement 54-56 is traversed both by the incoming system beam 51F and the retro-reflection of this beam by reflector 53—therefore, in order for the polarizer 56 not to override the polarization modulation effected by the modulator/attenuator 55 on the retro-reflected photon stream, the polarizer 56 must be disposed between the retro-reflector 53 and the modulator/attenuator 55.

Figure 2:
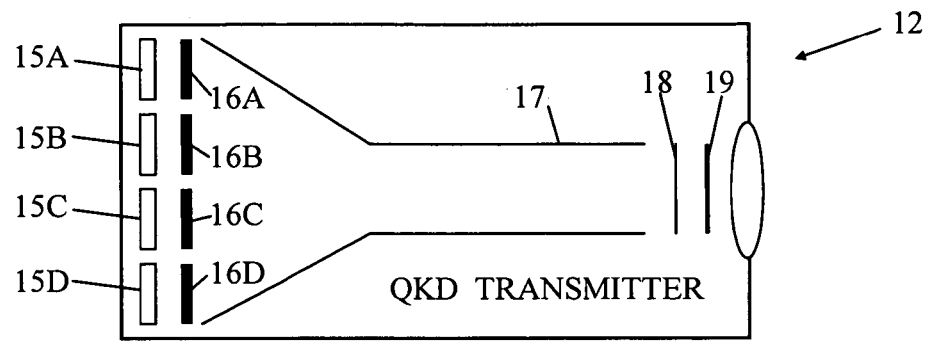
FIG. 2 is a diagram of a QKD transmitter of the FIG. 1 system.
Figure 6:
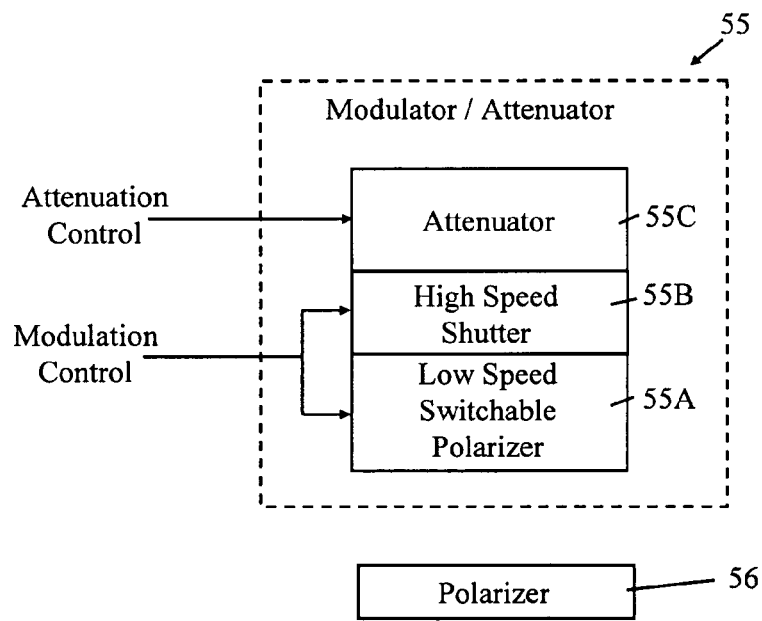
FIG. 6 is a diagram of a modulator/attenuator of the FIG. 5 QKD transmitter.

One suitable form of the modulator/attenuator 55 is illustrated in FIG. 6 and comprises three functional elements, namely:

- a lower speed switchable polarizer 55A (such as a Pockels cell) for rotating the polarization of the photon stream passing through it under the control of a modulation controller 59 fed with random bit pairs determining polarization basis and data bit value as described above with reference to the QKD system of FIGS. 1 to 3; conveniently,
- a high-speed shutter 55B (implemented, for example, using layer liquid crystal technology) for dividing the photon stream passing through it into pulses (for example, into 2 nanoseconds pulses, one every 200 nanoseconds); the modulation controller 59 is also used to control the shutter 55B (shuttering can be thought of as a form of modulation); and
- a controllable attenuator 55C for attenuating the photon stream passing through it under the control of an attenuation controller 58 in order to stabilize the photon stream such that on average the returning quantum signal is 0.1 photons/pulse (thereby making it highly unlikely that two or more photons will be emitted in any one pulse).

The shutter 55B is positioned such that the switchable polarizer 55A lies between the shutter 55B and the polarizer 56; the polarizer 56, the switchable polarizer 55A, and the shutter 55B thus occur in this order of proximity to the retro-reflector 53. The position of the attenuator 55C relative to the other elements 55A, 55B is not critical.

The functional elements 55A-55C may be provided by separate physical devices, or two or all three elements may be combined in a single physical device. For example, the shutter 55B and attenuator 55C may be combined into a single attenuating component which in a 'closed' state fully attenuates, and in an 'open' state attenuates to a level set by the attenuation controller to achieve the above-mentioned average returning quantum signal of 0.1 photons/pulse.

The QKD transmitter 12 further comprises an intensity detector 57 arranged to output an indication of retro-reflected photon intensity. Such an indication can be generated by observing the incoming or retro-reflected photon stream at any point (except downstream of the attenuator 55C in the retro-reflected stream) but is preferably done by making at least part of the retro-reflector 53 partially transmissive and placing the detector behind the retro-reflector. The output from the intensity detector 57 is fed as an input to the attenuation controller, the latter being arranged to increase the attenuation effected by element 55C with increasing detected intensity (and conversely to decrease attenuation with decreasing detected intensity) whereby to stabilize the average photon count per pulse below a preset threshold value. Thus, should the intensity of the system beam entering the QKD transmitter 12 increase (for example, as a result of the QKD receiver 22 being brought closer to the transmitter 12), the average photon count in the returned quantum signal 51R is still kept at a level (for example, 0.1) making it unlikely that more than one photon is returned per pulse (it be appreciated that if more than one photon is returned, the possibility arises of an eavesdropper being able to observe the returned quantum signal without being detected).

Effecting attenuation control in dependence on detected intensity also has the major advantage of making the transmitter 12 safe from unwanted interrogation by a probe beam 70F aimed at the transmitter by a third party. Without intensity-dependent attenuation control, the probe beam 70F would be reflected by the retro-reflector and the returned beam 70R would be polarized by the switchable polarizer 55A in the same way as the quantum signal. However, as a result of the probe beam 70F adding to the intensity detected by the detector 57, the attenuation effected by the attenuator 55C is increased to a level whereby it is highly unlikely that the same pulse will provide both a photon for the quantum signal 51R returned to the QKD receiver and a photon for the retro-reflected probe beam 70R returned to the third party.

Another protection against eavesdroppers arises from the provision of the shutter 55B on the externally-facing side of the switchable polarizer 55. In this position the shutter inhibits external inspection of the state of the switchable polarizer 55A—if the shutter were absent, some background level of light (and therefore retro-reflected photons) would continuously be present allowing for the polarization state of switchable polariser 55A to be observed.

It will be appreciated that many variants are possible to the above described embodiments of the invention. Thus, although the form of the QKD transmitter described above with reference to FIGS. 5 & 6 is particularly advantageous in the context of a QKD transmitting device intended for handheld operation, it will be appreciated that the QKD transmitter could also be used in any mobile, or indeed fixed, QKD transmitting installation.

Rather than providing protection against a probe beam 70F by varying the attenuation in dependence on detected intensity, the attenuation provided by attenuator 55C could be fixed and the controller 58 arranged instead to abort operation of the transmitting apparatus 10 upon the intensity detector 57 detecting a higher than expected photon intensity (this being taken as indicating the presence of a probe beam).

It will be appreciated the duration of each pulse (or more accurately of the time slot in which photons are allowed through the shutter 55B) can be varied from that stated above; however this duration is preferably in the range from 1 to 5 nanoseconds with a period in the range from 100 to 500 nanoseconds.

Furthermore, although the average photon count per pulse (time slot) of the returned quantum signal 51R is stated as being kept to 0.1, the count could be stabilized to some other value and is preferably kept less than a threshold value of 0.5.

Provided the system beam 51F has a degree of spreading, the QKD transmitter described above with reference to FIGS. 5 & 6 can be used in a QKD system without the need for alignment measures to align the longitudinal of the QKD transmitter and receiver (though appropriate alignment measures can be provided if desired). With regard alignment of the polarization axes of the transmitter and receiver, appropriate measures will need to be taken such as described in US published application 20070025551 or US published application 20060290941.

The invention claimed is:

1. A QKD transmitter comprising:
   a retro-reflector for retro-reflecting an incoming photon beam;
   an optical arrangement disposed in front of the retro-reflector and functionally providing in order from the retro-reflector:
      a polarizer for imparting a predetermined polarization to the photon beam,
      a polarization modulator responsive to a control signal to rotate the polarization of the retro-reflected photon beam relative to said predetermined polarization whereby to polarization modulate the retro-reflected beam, and
      a high speed shutter for limiting photon transmission to a succession of discrete time slots,
      the optical arrangement also functionally providing an attenuator;
   an intensity detector for outputting an indication of retro-reflected photon intensity; and
   an intensity-dependent controller for controlling the QKD transmitter in dependence on said intensity indication.

2. A QKD transmitter according to claim 1, wherein the attenuator effects a degree of attenuation that is controllable, the intensity-dependent controller being arranged to control the attenuator in dependence on said intensity indication so that an average retro-reflected photon count per time slot is below a predetermined threshold.

3. A QKD transmitter according to claim 2, wherein the predetermined threshold is 0.5.

4. A QKD transmitter according to claim 2, wherein the duration of each time slot is in a range from 1 to 5 nanoseconds with a period in a range from 100 to 500 nanoseconds.

5. A QKD transmitter according to claim 1, wherein the intensity-dependent controller is arranged to abort operation of the QKD transmitter upon said indication indicating an unexpectedly high photon intensity.

6. A QKD transmitter according to claim 1, wherein at least a portion of the retro-reflector is partially transmitting whereby to allow passage therethrough of a proportion of the incoming photon beam, the intensity detector being disposed behind the retro-reflector and being arranged to provide said indication as a measure of a photon intensity passing through the retro-reflector.

7. A QKD transmission method comprising:
   retro-reflecting an incoming photon beam;
   imparting a predetermined polarization to the photon beam;
   polarization modulating the retro-reflected photon beam by rotating the polarization of the retro-reflected photon beam relative to said predetermined polarization;
   limiting reflection back out of the photon beam to a succession of discrete time slots, and
   attenuating the photon beam in dependence on retro-reflected photon intensity to stabilize an average retro-reflected photon count per time slot.

8. The method of claim 7, wherein the average retro-reflected photon count per time slot is stabilized to a value less than 0.5 after attenuation.

9. The method of claim 7, wherein the average retro-reflected photon count per time slot is stabilized to a value approximating 0.1 after attenuation.

10. The method of claim 7, wherein the duration of each time slot is in a range from 1 to 5 nanoseconds with a period in a range from 100 to 500 nanoseconds.

11. The method of claim 7, determining an indication of the retro-reflected photon intensity by measuring an intensity of photons passing through a partly transmitting portion of a retro-reflector that retro-reflects the incoming photon beam.

* * * * *